3,138,596
6-URACIL-CARBOXYLIC ACID DERIVATIVES AND PROCESS OF PREPARING SAME

Cornelis U. Kloosterman, Deventer, and Jan Kok, Amsterdam, Netherlands, assignors to Koninklijke Industrieele Maatschappij Voorheen Noury & van der Lande N.V., Deventer, Netherlands, a corporation of the Netherlands
No Drawing. Filed Dec. 15, 1960, Ser. No. 75,933
Claims priority, application Great Britain Dec. 18, 1959
9 Claims. (Cl. 260—256.4)

The present invention relates to new derivatives of 1,2,3,6-tetrahydro-2,6-dioxo-4-pyrimidine-carboxylic acid and to a process for the preparation of these new compounds.

It is well-known that 1,2,3,6-tetrahydro-2,6-dioxo-4-pyrimidine-carboxylic acid, hereinafter referred to as "6-uracil-carboxylic acid," may be used as a growth-promoting agent for various micro-organisms, such as *Lactobacillus bulgaricus*. It is presumed that in the living organism the compound is hydrated to di-hydro-uracil-carboxylic acid, decarboxylated and then incorporated as pyrimidine. It is also known that the growth of animal cells may be stimulated by 6-uracil-carboxylic acid.

Furthermore, it is well-known that uracil-sulphonic acid, uracil-sulphonamide and uracil-methyl-sulphone have an antagonistic effect. A similar effect is observed with 5-fluoro-uracil, 5-fluoro-6-uracil-carboxylic acid and 6-aza-uracil.

Surprisingly, it has now been found that derivatives of 6-uracil-carboxylic acid not hitherto described in the literature, and which are compounds of the general formula:

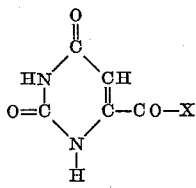

(in which X represents one of the following groups:

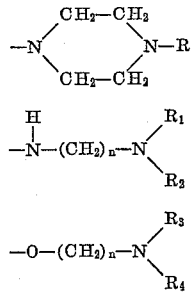

in which R, $R_1$, $R_2$, $R_3$ and $R_4$ represent hydrocarbon groups, either saturated or unsaturated, with a chain length of not more than 4 C-atoms, in which, however, R may be a hydrogen atom, and $n$ an integer not greater than 4) or salts of said compounds stunt the growth of micro-organisms.

According to one aspect of the present invention, therefore, there are provided novel compounds of the formula

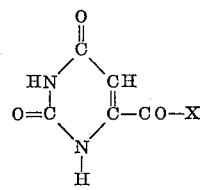

wherein X is as defined above.

According to another aspect of the present invention, a process for the preparation of novel compounds as defined in the preceding paragraph is provided, which process comprises reacting a compound of the formula XH, in which X is as defined above, with a compound having the formula:

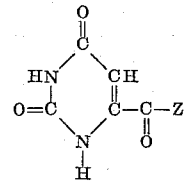

in which Z represents a halogen atom.

The new compounds according to the present invention which, for the rest, may be obtained according to methods known per se for broadly analogous processes, are preferably prepared by reacting a compound having the general formula XH, in which X has the meaning defined above, with a compound having the general formula:

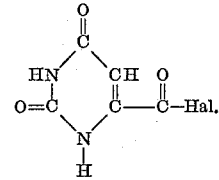

in which Hal. represents a halogen-atom.

Preferably, the hitherto unknown 6-uracil-carbonyl-chloride is employed for that purpose.

Furthermore, it is advantageous to react a compound having the formula XH with a mixture which is finally obtained if an alkali metal salt, preferably the potassium salt, of 6-uracil-carboxylic acid, is allowed to react upon oxalyl chloride.

In order to indicate still more fully the nature of the present invention, the following examples of typical procedure are set forth, it being understood however that this description is here presented by way of illustration only and not as limiting the scope of the invention.

Example 1

PREPARATION OF N-(2-DIETHYLAMINOETHYL)-6-URACILCARBOXAMIDE-HCl

The starting material for this preparation was a mixture of molar amounts of 6-uracil-carbonyl-chloride and potassium chloride, which was obtained in the following way. Starting from 89.6 g. of the potassium salt of 6-uracil-carboxylic acid and 415 g. of oxalyl chloride, 124.7 g. of the above-mentioned mixture was obtained, after boiling under reflux for 2 hrs. and removing the excess oxalyl chloride by distillation in vacuo. This mixture consisted of about 70% of 6-uracil-carbonyl-chloride and about 30% of potassium chloride and had a chlorine content of 28.1%.

The aforesaid mixture of 6-uracil-carbonyl-chloride and potassium chloride was suspended, with stirring, in 800 cc. chloroform. A solution of 58 g. N,N-diethyl-ethylenediamine in 150 cc. chloroform was added dropwise to this mixture with stirring and ice-cooling. The temperature was raised slowly and the mixture was boiled under reflux for one-half hour.

After cooling, the salt mixture (consisting of the desired product and potassium chloride) was filtered, washed with chloroform and dried. Subsequently, it was extracted with 600 cc. boiling glacial acetic acid and filtered hot. The potassium chloride remained on the filter. The filtrate was mixed with 6 l. acetone. After a few hours' stirring at room temperature, the precipitate formed was filtered, washed with acetone and dried at 90° C. A white powder was obtained in a yield of 113.3 g.; melting point 245–246° C. with decomposition.

Analysis:

|  | C, percent | H, percent | N, percent | Cl, percent |
| --- | --- | --- | --- | --- |
| Found | 45.25 | 6.55 | 19.50 | 12.10 |
| Calculated | 45.45 | 6.54 | 19.27 | 12.22 |

Example II

PREPARATION OF 6-URACIL-CARBOXYLIC ACID-2-DIMETHYLAMINO ETHYL ESTER-HCl 124.5 g. (=0.5 mol) 6-uracil-carbonyl-chloride-potassium-chloride mixture were suspended with stirring in 800 cc. chloroform. A solution of 44.5 g. (=0.5 mol) dimethylamino ethanol in 150 cc. chloroform was added dropwise to this mixture with stirring and ice-cooling. The temperature was slowly raised and the mixture was boiled under reflux for one-half hour. After cooling, the mixture consisting of the desired product and potassium chloride was filtered, washed with chloroform and dried. Subsequently, it was extracted with 1400 cc. boiling glacial acetic acid and filtered hot. The potassium chloride remained on the filter. After cooling, the crystallised product was filtered and washed with acetone. From the mother-liquor, a large part of the acetic acid was removed by distilling in vacuo. After cooling, another part of the desired product was obtained.

Total yield: 107.5 g. of a white powder; melting point 244°–246° C. with decomposition.

Analysis:

|  | C, percent | H, percent | N, percent | Cl, percent |
| --- | --- | --- | --- | --- |
| Found | 40.82 | 5.40 | 16.03 | 13.61 |
| Calculated | 40.99 | 5.32 | 15.94 | 13.47 |

Example III

PREPARATION OF 6-URACIL-CARBONYL-PIPERAZINE-HCl-MONOHYDRATE 125 g. (0.5 mol) 6-uracil-carbonyl-chloride-potassium-chloride mixture were suspended with stirring in freshly distilled chloroform. During a period of 4 hours at room temperature a solution of 43 g. (0.5 mol) of anhydrous piperazine in 300 cc. chloroform was added to this suspension. Thereafter it was boiled under reflux during 6 hours. After cooling, the mixture obtained consisting of the desired product and potassium chloride was filtered, washed twice with 50 cc. chloroform and dried at 100° C. Subsequently the dried product was suspended in 700 cc. distilled water whereafter it was sucked off closely. The filtrate was evaporated in vacuo to 140 cc. at a temperature below 30° C., after which 700 cc. acetone was added to the filtrate evaporated as such. The precipitate of potassium chloride thereupon formed was sucked off and washed with acetone. After standing for one night the desired product crystallized from the mother liquor; this was filtrated, washed and dried. A white powder was obtained in a yield of 50 g.; melting point about 360° C. with decomposition.

Analysis:

|  | C, percent | H, percent | N, percent | Cl, percent |
| --- | --- | --- | --- | --- |
| Found | 39.01 | 5.49 | 20.06 | 13.00 |
| Calculated | 38.78 | 5.39 | 20.11 | 12.75 |

While specific examples of preferred methods embodying the present invention have been described above, it will be apparent that many changes and modifications may be made in the details thereof without departing from the spirit of the invention. It will therefore be understood that the examples cited and the particular method of procedure set forth above are intended to be illustrative only, and are not intended to limit the scope of the invention.

What is claimed is:

1. A compound selected from the class consisting of (a) compounds having the formula:

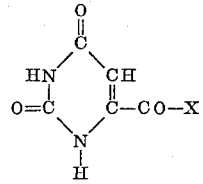

[I]

in which X is selected from the group consisting of (i) 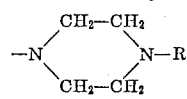

(ii) 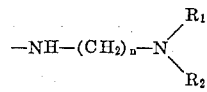

and (iii) 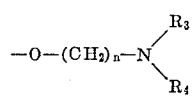

in which R is selected from the group consisting of hydrogen and saturated and unsaturated hydrocarbon groups having a chain length of not more than 4 carbon atoms, $R_1$, $R_2$, $R_3$ and $R_4$ are selected from the group consisting of saturated and unsaturated hydrocarbon groups having a chain length of not more than 4 carbon atoms, and $n$ is an integer not greater than 4, and (b) therapeutically acceptable salts of such compounds.

2. N-(2-diethylaminoethyl)-6-uracilcarboxamide.

3. 6-uracil-carboxylic acid-2-dimethylamino-ethyl ester.

4. 6-uracil-carbonyl-piperazine.

5. 6-uracil-carbonyl-piperazine hydrochloride monohydrate.

6. A process for preparing a compound [I] as defined in claim 1, which comprises reacting a compound of the formula XH, in which X is selected from the group consisting of (i), (ii) and (iii) as defined in claim 1, with a compound of the formula

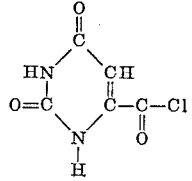

7. A process according to claim 6, in which the compound of the formula XH is reacted with a mixture obtained by reacting an alkali metal salt of 6-uracil carboxylic acid with oxalyl chloride.

8. A process according to claim 7, in which potassium 6-uracil carboxylate is reacted with oxalyl chloride.

9. A process according to claim 6, in which 6-uracil carbonyl-chloride is reacted with a compound selected from the class consisting of N,N-diethyl-ethylenediamine dimethyl-amino-ethanol and anhydrous piperazine.

References Cited in the file of this patent
UNITED STATES PATENTS 2,948,275   Duschiensky et al. _____ Aug. 9, 1960

FOREIGN PATENTS 583,712   Canada _____ Sept. 22, 1959

OTHER REFERENCES

Greenbaum: Jour. Amer. Chem. Soc., vol. 76, pages 6052–6054 (1954).